United States Patent
Yamada et al.

(10) Patent No.: US 12,501,920 B2
(45) Date of Patent: Dec. 23, 2025

(54) METHOD FOR PRODUCING INSTANT JAPANESE NOODLES

(71) Applicant: NISSIN FOODS HOLDINGS CO., LTD., Osaka (JP)

(72) Inventors: Yusuke Yamada, Osaka (JP); Kohei Sanada, Osaka (JP); Justin Ndagijimana, Osaka (JP); Shogo Ishida, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 1031 days.

(21) Appl. No.: 17/440,069

(22) PCT Filed: Mar. 25, 2020

(86) PCT No.: PCT/JP2020/013253
§ 371 (c)(1),
(2) Date: Sep. 16, 2021

(87) PCT Pub. No.: WO2020/203529
PCT Pub. Date: Oct. 8, 2020

(65) Prior Publication Data
US 2022/0183331 A1 Jun. 16, 2022

(30) Foreign Application Priority Data
Mar. 29, 2019 (JP) ................. 2019-065443

(51) Int. Cl.
*A23L 7/113* (2016.01)
*A23L 27/40* (2016.01)

(52) U.S. Cl.
CPC ............. *A23L 7/113* (2016.08); *A23L 27/45* (2016.08); *A23V 2002/00* (2013.01)

(58) Field of Classification Search
CPC ................ A23L 7/113; A23L 27/45
See application file for complete search history.

(56) References Cited

U.S. PATENT DOCUMENTS

| | | |
|---|---|---|
| 2009/0047396 A1 | 2/2009 | Ikeda |
| 2009/0196957 A1 | 8/2009 | Vadlamani et al. |
| 2012/0201945 A1 | 8/2012 | Iwahata et al. |
| 2016/0249652 A1* | 9/2016 | Tanaka ............. A23L 7/113 426/557 |
| 2016/0374369 A1* | 12/2016 | Hirano ............. A23L 33/26 426/589 |
| 2017/0143022 A1* | 5/2017 | Wicker ............. A23L 2/56 |
| 2020/0178579 A1 | 6/2020 | Kitano et al. |
| 2021/0112835 A1 | 4/2021 | Kuroda et al. |

FOREIGN PATENT DOCUMENTS

| | | |
|---|---|---|
| JP | 2005-278567 | 10/2005 |
| JP | 4644298 B1 | 3/2011 |
| JP | 4761534 B2 | 8/2011 |
| JP | 2015-084772 | 5/2015 |
| JP | 2015-213434 | 12/2015 |
| JP | 2017-029079 | 2/2017 |
| JP | 2017-070217 A | 4/2017 |
| JP | 2019-062778 | 4/2019 |
| JP | 2019-110833 | 7/2019 |
| JP | 2019-140963 | 8/2019 |
| KR | 100881165 B1 | 2/2009 |
| WO | 2011/040505 | 4/2011 |
| WO | 2019/116965 | 6/2019 |

OTHER PUBLICATIONS

Second Office Action issued in Chinese Patent Application No. 202080020790.3, issued Jul. 17, 2024, 11 pages, English machine translation provided.
Li et al., "Study on Characteristics of Salt-Enhanced Peptides Prepared by Enzymatic Hydrolysis of Larimichthys crocea", Modern Food Science and Technology, Jun. 3, 2019, vol. 35, No. 6, pp. 184-190, English abstract.
Office Action issued for Chinese Patent Application No. 202080020790. 3, Jan. 3, 2024, total of 13 pages including English translation.
International Search Report and Written Opinion of PCT/JP2020/013253, Jun. 23, 2020, 10 pages including English translation of the International Search Report.

* cited by examiner

*Primary Examiner* — Stephanie A Kohler
(74) *Attorney, Agent, or Firm* — HSML P.C.

(57) ABSTRACT

An object of the present invention is to provide a method for producing instant Japanese noodles having a reduced amount of salt kneaded into the noodles, wherein the instant Japanese noodles are enhanced in salty taste. When the amount of salt kneaded into instant Japanese noodles is reduced, the instant Japanese noodles can be enhanced in salty taste by adding potassium lactate, granulated sugar, citric acid, and a kelp processed product and/or a dried bonito processed product, instead of salt, and thus instant Japanese noodles having favorable salty taste can be produced even if the amount of salt is reduced.

3 Claims, No Drawings

METHOD FOR PRODUCING INSTANT JAPANESE NOODLES

TECHNICAL FIELD

The present invention relates to a method for producing instant Japanese noodles having a reduced amount of salt kneaded into the noodles, wherein the instant Japanese noodles are enhanced in salty taste.

BACKGROUND ART

In recent years, many products having a reduced sodium content, so-called reduced-salt products have been marketed in order to prevent hypertension. While the target values of salt intake per day for adult men and for adult women have been respectively less than 9 g and less than 7.5 g according to "Dietary Reference Intakes for Japanese" (2010) by the Ministry of Health, Labour and Welfare, the target values of salt intake per day for adult men and for adult women have been respectively reduced to less than 8 g and less than 7 g according to "Dietary Reference Intakes for Japanese" (2015). Thus, intention for salt reduction is considered to be stronger from now on.

For example, Patent Literatures 1 to 4 each disclose a technique for reducing the amount of salt in noodles.

Patent Literature 1 describes a technique for wheat noodles which have sufficient elasticity even if the amount of salt added into the noodles is smaller than conventional one, and specifically, the wheat noodles contains wheat flour, a thickener composition, and water, the thickener composition containing xanthan gum, locust bean gum, and guar gum.

Patent Literature 2 describes a technique for production of salt-free or reduced-salt Chinese noodles, and specifically, arginine or arginine salt is mixed with wheat flour, followed by making noodles.

Patent Literature 3 describes noodles in which the contents of sodium salt, in particular, sodium chloride and sodium carbonate are reduced or zero, and a method for producing such noodles. Specifically, Patent Literature 3 describes noodles containing any one of or both of isomaltulose and reduced isomaltulose, and a method for producing such noodles.

Patent Literature 4 describes a technique for producing salt-free noodles without any addition of salt, specifically, a method for producing noodles involving utilizing magnesium chloride included in bittern.

CITATION LIST

Patent Literature

Patent Literature 1: Japanese Patent Laid-Open No. 2015-84772
Patent Literature 2: Japanese Patent Laid-Open No. 2015-213434
Patent Literature 3: Japanese Patent No. 4644298
Patent Literature 4: Japanese Patent No. 4761534

SUMMARY OF INVENTION

Technical Problem

An object of the present invention is to provide a method for producing instant Japanese noodles having a reduced amount of salt kneaded into the noodles, wherein the instant Japanese noodles are enhanced in salty taste.

Solution to Problem

The inventors have made studies about salt reduction in buckwheat noodles (soba) or wheat noodles (udon) as instant Japanese noodles. However, any existing noodle making technique for the purpose of salt reduction has not enabled any instant Japanese noodles having satisfactory eating quality, although such technique enabled noodle making. One reason is, for example, because the taste of soup is light unlike that of ramen to result in easily tasting noodles and thus easily sensing the weakened salty taste and the occurrence of odd taste such as bitter taste. The inventors have then made intensive studies, and as a result, have found a method for enhancing salty taste of instant Japanese noodles without causing any sensing of odd taste in reduction in amount of salt for use in the noodles, thereby leading to the present invention.

Specifically, provided is a method for producing instant Japanese noodles, including kneading potassium lactate, granulated sugar, citric acid, and a dried bonito processed product and/or a kelp processed product into noodles to enhance salty taste, in addition to reducing an amount of salt kneaded into the noodles.

In a case where the instant Japanese noodles in the present invention are wheat noodles, it is preferable to add 0.03 to 0.08 g of potassium lactate, 0.05 to 0.20 g of granulated sugar, 0.04 to 0.17 g of citric acid, and 0.004 to 0.15 g of a kelp processed product in terms of kelp dry matter, per a reduced amount of 1 g of salt added to the noodles.

In a case where the instant Japanese noodles in the present invention are buckwheat noodles, it is preferable to add 0.10 to 0.39 g of potassium lactate, 0.03 to 0.13 g of granulated sugar, 0.003 to 0.063 g of citric acid, and 0.06 to 0.25 g of a dried bonito processed product in terms of dried bonito dry matter, per a reduced amount of 1 g of salt added to the noodles.

Advantageous Effects of Invention

The present invention can provide a method for producing instant Japanese noodles having a reduced amount of salt kneaded into the noodles, wherein the instant Japanese noodles are enhanced in salty taste.

DESCRIPTION OF EMBODIMENTS

Hereinafter, the present invention is described in detail. However, the present invention is not limited by the following description.

1. Raw Material Formulation of Japanese Noodles

Examples of a main raw material powder for use in production of the instant Japanese noodles in the present invention include cereal flour such as wheat flour and buckwheat flour, and various starches such as potato starch, tapioca starch and corn starch. The starch to be used can also be any of raw starch, gelatinized starch, and modified starches such as acetylated starch, etherified starch and crosslinked starch. In a case where the instant Japanese noodles are wheat noodles, wheat flour is essentially used and various starches can be used as an additional main raw material powder. In a case where the noodles are buckwheat noodles, buckwheat flour is essentially used and wheat flour and various starches can be used as an additional main raw material powder.

In the present invention, other raw material commonly used in production of instant Japanese noodles can be added, including salt, an alkaline agent, phosphates, various thickeners, a noodle quality modifier, fat or oil, a pH adjuster and a preservative. These other raw materials may be added together with the main raw material powder, or may be dissolved or suspended in kneading water and then added.

In the present invention, potassium lactate, granulated sugar, citric acid, and a dried bonito processed product and/or a kelp processed product are added and kneaded into the noodles, in addition to reducing the amount of salt kneaded into the noodles.

Potassium Lactate

Potassium lactate is commercially available in the form of a high-concentration liquid, and therefore such a liquid can be added to kneading water and thus kneaded into the noodles. The amount of potassium lactate added is preferably 0.03 to 0.08 g per a reduced amount of 1 g of salt, in a case where the instant Japanese noodles are wheat noodles. The amount of potassium lactate added is preferably 0.10 to 0.39 g per a reduced amount of 1 g of salt in a case where the instant Japanese noodles are buckwheat noodles. In a case where the noodles are wheat noodles, the noodles have less miscellaneous taste. Thus, not only even a small amount of potassium lactate allows salty taste thereof to be sensed, but also a large amount thereof causes harsh taste to be strongly sensed. On the contrary, in a case where the noodles are buckwheat noodles, buckwheat flour has miscellaneous taste. Thus, salty taste of potassium lactate and also harsh taste thereof are hardly sensed even if potassium lactate is added in a certain larger amount than in wheat noodles.

Granulated Sugar

Granulated sugar is soluble in water, and therefore can be dissolved in kneading water before adding and thus granulated sugar can be kneaded into the noodles in this manner. While granulated sugar is specified herein, other sugar may be used in the present invention. In this case, such other sugar is added so as to impart a degree of sweetness comparable with that of granulated sugar. Granulated sugar has no miscellaneous taste, and causes no unclear taste, and an enhancement of salty taste is thus easily adjusted when using granulated sugar, as compared with other sugar. The amount of granulated sugar added is preferably 0.05 to 0.20 g per a reduced amount of 1 g of salt, in a case where the instant Japanese noodles are wheat noodles. The amount of granulated sugar added is preferably 0.03 to 0.13 g per a reduced amount of 1 g of salt in a case where the instant Japanese noodles are buckwheat noodles.

Citric Acid

Citric acid is soluble in water, and therefore can be dissolved in kneading water before adding, and thus citric acid can be kneaded into the noodles in this manner. While citric acid is specified herein, conversion is made in terms of anhydride in the present invention. Citric acid has less acid odor and also mild acid taste, and an enhancement of salty taste is thus easily adjusted when using citric acid, as compared with other acid. The amount of citric acid added is preferably 0.04 to 0.17 g per a reduced amount of 1 g of salt, in a case where the instant Japanese noodles are wheat noodles. The amount of citric acid added is preferably 0.003 to 0.063 g per a reduced amount of 1 g of salt in a case where the instant Japanese noodles are buckwheat noodles.

Kelp Processed Product

Examples of the kelp processed product in the present invention include a powdered product of dried kelp, an extract from kelp, and a liquid product obtained by processing kelp by itself with a blender. The liquid product or extracted product can be dissolved in kneading water before added, and thus the kelp processed product can be kneaded into the noodles in this manner. The dried kelp powder can be added to and mixed with the main raw material powder, and thus the kelp processed product can be kneaded into the noodles in this manner. The kelp processed product is preferably added to wheat noodles, which has less miscellaneous taste, as the instant Japanese noodles, because delicious taste of the kelp processed product is softly sensed. In a case where the instant Japanese noodles are wheat noodles, 0.004 to 0.15 g of the kelp processed product in terms of kelp dry matter is preferably added per a reduced amount of 1 g of salt. The kelp processed product can also be used in a case where the instant Japanese noodles are buckwheat noodles, and, in this case, is preferably used together with a dried bonito processed product described below.

Dried Bonito Processed Product

Examples of the dried bonito processed product in the present invention include a dried bonito powder and an extract derived from dried bonito. The extracted product can be dissolved in kneading water before adding, and the dried bonito powder can be mixed with the main raw material powder before adding. The dried bonito processed product can be kneaded into the noodles in these manner. The dried bonito processed product is preferably added to buckwheat noodles, which has miscellaneous taste, as the instant Japanese noodles, because delicious taste of the dried bonito processed product is sharply sensed. In a case where the instant Japanese noodles are buckwheat noodles, 0.06 to 0.25 g of the dried bonito processed product in terms of dried bonito dry matter is preferably added per a reduced amount of 1 g of salt. The dried bonito processed product can also be used in a case where the instant Japanese noodles are wheat noodles, and, in this case, is preferably used together with the above-mentioned kelp processed product.

2. Kneading Step

The method for preparing noodle dough in the present invention may be performed according to an ordinary method. In other words, a noodle material powder and kneading water may be kneaded by a batch mixer, a flow jet mixer, a vacuum mixer, or the like so as to be uniformly mixed, and thus crumbly dough may be prepared.

3. Noodle Making Step

Next, noodle strings are prepared from the dough prepared. The preparation method may be performed according to an ordinary method, and examples include a method involving forming the dough into a crude noodle belt with a roll, then forming a noodle belt by compounding or the like, further rolling out the noodle belt with a roll multiple times to impart a predetermined noodle belt thickness, and cutting out the noodle belt with a cutting-out roll called cutting blade to thereby prepare noodle strings. In a case where the noodle belt is prepared followed by preparing the noodle strings, the noodle belt may be prepared using an extruder, and then rolled out and cut out, or a plurality of noodle belts may be combined to prepare a noodle belt having a multi-layer structure and thereafter the noodle belt may be rolled out and cut out.

4. Steaming Step

The raw noodle strings obtained in the noodle making step are steamed to gelatinize, by an ordinary method. Preferable conditions of the steaming are varied depending on the type of noodles and the thickness of noodles, and thus may be appropriately set according to an objective texture. Examples of the steaming method include heating with boiling or saturated water vapor, and also heating with overheated water vapor, and any moisture supplying step such as showering or dipping can also be combined. Noodles cooked can also be dipped in a seasoning liquid, if necessary, or a loosening agent can also be added to the noodles, if necessary.

5. Drying Step

The type of the drying step is not particularly limited, and a drying treatment commonly used in production of instant noodles can be applied. Specific examples include fried drying treatments, and also non-fried drying treatments such as a hot-air drying treatment, a high-temperature hot-air drying treatment, a superheated steam drying treatment, a freeze drying treatment, a microwave drying treatment, and an air drying treatment at a low temperature. These treatments can also be combined in the drying step. While specific conditions are not particularly limited, a fried drying treatment is usually performed at 130 to 160° C. for 1 to 3 minutes and a hot-air drying treatment is usually performed at 60 to 150° C. for about 5 to 180 minutes. The moisture content after the drying treatment may be about 1 to 5% by mass in the case of the fried drying treatment, and may be about 5 to 10% by mass in the case of the hot-air drying treatment.

Alternatively, fresh type instant noodles may be obtained by pH adjustment, sealing, and heat sterilization without undergoing the drying step.

As described above, when reducing the amount of salt kneaded into instant Japanese noodles, potassium lactate, granulated sugar, citric acid, and a kelp processed product and/or a dried bonito processed product, instead of salt, can be added into the noodles to thereby enhance salty taste of the instant Japanese noodles, and thus, instant Japanese noodles having favorable salty taste can be produced even if the amount of salt is reduced.

EXAMPLES

Hereinafter, the embodiments are described in more detail with reference to Examples.

<Experiment 1> Examination of Instant Japanese Noodles (Wheat Noodles)

Test Example 1

Noodle dough was prepared by mixing 1 kg of a main raw material powder consisting of 750 g of all-purpose flour and 250 g of acetylated tapioca starch with 10 g of gluten and 5 g of calcium carbonate as sub raw material powders, adding kneading water obtained by dissolving 28 g of salt, 3 g of trisodium phosphate, 1 g of sodium pyrophosphate, 0.4 g of polymeric phosphate, 0.5 g of anhydrous citric acid and 0.4 g of a tocopherol preparation in 430 g of water, further adding 10 ml of palm olein oil thereto, and mixing the resultant by a normal pressure mixer for 15 minutes.

The dough prepared was formed into a crude noodle belt with a roll, and compounded to thereby prepare a noodle belt. The noodle belt prepared was rolled out with a roll so that the final noodle belt thickness was 1.2 mm, and the noodle belt was cut with a cutting blade roll of a square blade (No. 9), to thereby provide noodle strings.

Next, the noodle strings were steamed for 2 minutes in a steam chamber into which saturated steam was introduced at a flow rate of 240 kg/h, to thereby gelatinize the noodle strings.

The noodle strings gelatinized were dipped in a flavoring obtained by dissolving 0.5 g of soybean dietary fibers, 3 g of anhydrous citric acid and 10 g of salt in water and diluting up to 1 L, and cut to about 30 cm. Thereafter, the resulting noodle strings were packed in a retainer in an amount of 115 g per meal, and fried in palm oil heated to 150° C. for 2 minutes to be dried, to thereby obtain a sample of instant fried noodles (wheat noodles) having a water content of 4% by mass.

Test Example 2

A sample of instant fried noodles (wheat noodles) was prepared in the same manner as in Test Example 1 except that the content of salt added to the kneading water was 22 g.

Test Example 3

A sample of instant fried noodles (wheat noodles) was prepared in the same manner as in Test Example 2 except that 0.3 g of potassium lactate (aqueous 78% by mass solution) was added to the kneading water.

Test Example 4

A sample of instant fried noodles (wheat noodles) was prepared in the same manner as in Test Example 2 except that 0.3 g of granulated sugar was added to the kneading water.

Test Example 5

A sample of instant fried noodles (wheat noodles) was prepared in the same manner as in Test Example 3 except that 0.3 g of granulated sugar was added to the kneading water.

Test Example 6

A sample of instant fried noodles (wheat noodles) was prepared in the same manner as in Test Example 5 except that 0.5 g of the kelp powder as a sub raw material powder was added when mixing the raw material powders.

Test Example 7

A sample of instant fried noodles (wheat noodles) was prepared in the same manner as in Test Example 5 except that 1.5 g of the dried bonito powder as a sub raw material powder was added when mixing the raw material powders.

Test Example 8

A sample of instant fried noodles (wheat noodles) was prepared in the same manner as in Test Example 5 except that 0.3 g of the kelp powder and 0.5 g of the dried bonito powder as sub raw material powders were added.

Test Example 9

A sample of instant fried noodles (wheat noodles) was prepared in the same manner as in Test Example 6 except that the amount of potassium lactate (aqueous 78% by mass solution) added was 0.2 g.

Test Example 10

A sample of instant fried noodles (wheat noodles) was prepared in the same manner as in Test Example 6 except that the amount of potassium lactate (aqueous 78% by mass solution) added was 0.6 g.

Test Example 11

A sample of instant fried noodles (wheat noodles) was prepared in the same manner as in Test Example 6 except that the amount of citric acid added was 0.25 g.

Test Example 12

A sample of instant fried noodles (wheat noodles) was prepared in the same manner as in Test Example 6 except that the amount of citric acid added was 1.0 g.

Test Example 13

A sample of instant fried noodles (wheat noodles) was prepared in the same manner as in Test Example 6 except that the amount of granulated sugar added was 0.6 g.

Test Example 14

A sample of instant fried noodles (wheat noodles) was prepared in the same manner as in Test Example 6 except that the amount of granulated sugar added was 1.2 g.

Test Example 15

A sample of instant fried noodles (wheat noodles) was prepared in the same manner as in Test Example 6 except that the amount of the kelp powder added was 0.9 g.

Test Example 16

A sample of instant fried noodles (wheat noodles) was prepared in the same manner as in Test Example 13 except that 0.6 g of a kelp extract (4% in terms of dry matter) instead of the kelp powder was added to the kneading water.

Test Example 17

A sample of instant fried noodles (wheat noodles) was prepared in the same manner as in Test Example 13 except that 1.3 g of a kelp extract (4% in terms of dry matter) instead of the kelp powder was added to the kneading water.

Sensory evaluation about salty taste of noodles was performed by cooking and eating a sample of each Test Section. The evaluation was made by 5 experienced panelists. The result of Test Example 1 was defined as Score 5 and that of Test Example 2 was defined as Score 1. A case where salty taste was sensed at the same level as in Test Example 1 and was very favorable was defined as Score 5; a case where salty taste was favorably sensed although not sensed at the same level as in Test Example 1 was defined as Score 4; a case where salty taste was generally acceptable although not sensed at the same level as in Test Example 1 was defined as Score 3; a case where salty taste was not enough although more sensed than in Test Example 2 was defined as Score 2; and a case where salty taste was sensed only at the same level as in Test Example 2 was defined as Score 1. The cooking method here was as follows: a sample of noodles and a powdered soup for wheat noodles were placed in a bowl-type foamed polystyrene container; 490 ml of boiling water was poured thereinto, followed by closing with a lid; the resultant was left to still stand for 5 minutes, followed by removing the lid; and the content of the container was well mixed.

The noodle making properties and sensory evaluation results for each Test Section of Experiment 1 are shown in Table 1 below.

TABLE 1

| Test Section | Salt g/kg of main raw material powder | Potassium lactate g/g of reduced amount of salt | Granulated sugar g/g of reduced amount of salt | Citric acid g/g of reduced amount of salt | Kelp powder g of dry matter/g of reduced amount of salt | Dried bonito powder g of dry matter/g of reduced amount of salt | Kelp extract g of dry matter/g of reduced amount of salt | Score | Comment |
|---|---|---|---|---|---|---|---|---|---|
| 1 | 28 | | | (0.5 g/kg of main raw material powder) | | | | 5 | Control (before salt reduction) |
| 2 | 22 | | | 0.08 | | | | 1 | Reduced-salt product (by about 20%) |
| 3 | 22 | 0.04 | | 0.08 | | | | 2 | Slightly, but insufficiently enhanced in salty taste |
| 4 | 22 | | 0.05 | 0.08 | | | | 2 | Slightly, but insufficiently enhanced in salty taste |
| 5 | 22 | 0.04 | 0.05 | 0.08 | | | | 3 | Enhanced in salty taste only at passing level |

TABLE 1-continued

| Test Section | Salt g/kg of main raw material powder | Potassium lactate g/g of reduced amount of salt | Granulated sugar g/g of reduced amount of salt | Citric acid g/g of reduced amount of salt | Kelp powder g of dry matter/g of reduced amount of salt | Dried bonito powder g of dry matter/g of reduced amount of salt | Kelp extract g of dry matter/g of reduced amount of salt | Score | Comment |
|---|---|---|---|---|---|---|---|---|---|
| 6 | 22 | 0.04 | 0.05 | 0.08 | 0.08 | | | 5 | Very favorable at same level as in Test Section 1 |
| 7 | 22 | 0.04 | 0.05 | 0.08 | | 0.25 | | 4 | Favorable salty taste, but bonito flavor sensed |
| 8 | 22 | 0.04 | 0.05 | 0.08 | 0.05 | 0.08 | | 4 | Favorable salty taste, but bonito flavor sensed slightly |
| 9 | 22 | 0.03 | 0.05 | 0.08 | 0.08 | | | 4 | Salty taste weaker than in Test Section 6, but at favorable level |
| 10 | 22 | 0.08 | 0.05 | 0.08 | 0.08 | | | 4 | Harsh taste more sensed than in Test Section 6, but salty taste sensed at favorable level |
| 11 | 22 | 0.04 | 0.05 | 0.04 | 0.08 | | | 4 | Salty taste weaker than in Test Section 6, but at favorable level |
| 12 | 22 | 0.04 | 0.05 | 0.17 | 0.08 | | | 4 | Acid taste more sensed than in Test Section 6, but salty taste sensed at favorable level |
| 13 | 22 | 0.04 | 0.10 | 0.08 | 0.08 | | | 5 | Very favorable at same level as in Test Section 1. Slightly stronger salty taste than in Test Section 6 |
| 14 | 22 | 0.04 | 0.20 | 0.08 | 0.08 | | | 4 | Salty taste weaker than in Test Section 6, but at favorable level |
| 15 | 22 | 0.04 | 0.05 | 0.08 | 0.15 | | | 4 | Kelp taste more sensed than in Test Section 6, but salty taste sensed at favorable level |
| 16 | 22 | 0.04 | 0.10 | 0.08 | | | 0.004 | 4 | Salty taste weaker than in Test Section 6, but at favorable level |
| 17 | 22 | 0.04 | 0.10 | 0.08 | | | 0.009 | 5 | Very favorable at same level as in Test Sections 1 and 13 |

Instant Japanese noodles (wheat noodles) are white noodles and thus an acid such as citric acid is incorporated thereinto in order not to cause browning of the noodles by frying and drying. As shown in Experiment 1, salty taste of instant Japanese noodles (wheat noodles) was enhanced by adding potassium lactate, granulated sugar, citric acid, and a kelp processed product and/or a dried bonito processed product, instead of salt reduced in amount thereof, and thus instant Japanese noodles (wheat noodles) having favorable salty taste was obtained. A dried bonito processed product was more preferable than a kelp processed product in the instant Japanese noodles (wheat noodles), and a kelp processed product more exhibited the effect of enhancing salty taste when added in the form of a kelp liquid (extract), than when added in the form of a kelp powder. Preferable amounts added, per a reduced amount of 1 g of salt added to the noodles, were as follows: potassium lactate: 0.03 to 0.08 g; granulated sugar: 0.05 to 0.20 g; citric acid: 0.04 to 0.17 g; and kelp processed product in terms of dry matter: 0.004 to 0.15 g.

<Experiment 2> Examination of Instant Japanese Noodles (Buckwheat Noodles)

Test Example 18

Noodle dough (dough) was prepared by mixing 1 kg of a main raw material powder consisting of 650 g of wheat flour, 50 g of tapioca starch and 300 g of buckwheat flour with 10 g of gluten and 5 g of calcium carbonate as sub raw material powders, adding kneading water obtained by dissolving 20 g of salt, 4.5 g of trisodium phosphate, 2.3 g of polymeric phosphate and 0.4 g of a tocopherol preparation in 380 g of water, further adding 3 ml of palm olein oil thereto, and mixing the resultant by a normal pressure mixer for 15 minutes.

The dough prepared was formed into a crude noodle belt by a roll, and compounded to thereby prepare a noodle belt. The noodle belt prepared was rolled out with a roll so that the final noodle belt thickness was 1.0 mm, and the noodle belt was cut with a cutting blade roll of a square blade (No. 18), to thereby provide noodle strings.

Next, the noodle strings were steamed for 2 minutes in a steam chamber into which saturated steam was introduced at a flow rate of 240 kg/h, to thereby gelatinize the noodle strings.

The noodle strings gelatinized were dipped in a flavoring obtained by dissolving 10 ml of light-colored soy sauce, 1 g of anhydrous citric acid and 10 g of salt in water and diluting up to 1 L, and cut to about 30 cm. Thereafter, the resulting noodle strings were packed in a retainer in an amount of 110 g per meal, and fried in palm oil heated to 150° C. for 2 minutes to be dried, to thereby obtain a sample of instant fried noodles (buckwheat noodles) having a water content of 3% by mass.

Test Example 19

A sample of instant fried noodles (buckwheat noodles) was prepared in the same manner as in Test Example 18 except that the content of salt added to the kneading water was 12 g.

Test Example 20

A sample of instant fried noodles (buckwheat noodles) was prepared in the same manner as in Test Example 19 except that 2.0 g of potassium lactate (aqueous 78% by mass solution) was added to the kneading water.

Test Example 21

A sample of instant fried noodles (buckwheat noodles) was prepared in the same manner as in Test Example 19 except that 0.3 g of granulated sugar was added to the kneading water.

Test Example 22

A sample of instant fried noodles (buckwheat noodles) was prepared in the same manner as in Test Example 19 except that 0.1 g of citric acid was added to the kneading water.

Test Example 23

A sample of instant fried noodles (buckwheat noodles) was prepared in the same manner as in Test Example 19 except that 2.0 g of potassium lactate (aqueous 78% by mass solution), 0.3 g of granulated sugar and 0.2 g of citric acid were added to the kneading water.

Test Example 24

A sample of instant fried noodles (buckwheat noodles) was prepared in the same manner as in Test Example 23 except that 1.0 g of the dried bonito powder as a sub raw material powder was added when mixing the raw material powders.

Test Example 25

A sample of instant fried noodles (buckwheat noodles) was prepared in the same manner as in Test Example 23 except that 0.5 g of the kelp powder as a sub raw material powder was added when mixing the raw material powders.

Test Example 26

A sample of instant fried noodles (buckwheat noodles) was prepared in the same manner as in Test Example 24 except that the amount of potassium lactate (aqueous 78% by mass solution) added was 1 g.

Test Example 27

A sample of instant fried noodles (buckwheat noodles) was prepared in the same manner as in Test Example 24 except that the amount of potassium lactate (aqueous 78% by mass solution) added was 4 g.

Test Example 28

A sample of instant fried noodles (buckwheat noodles) was prepared in the same manner as in Test Example 24 except that the amount of citric acid added was 0.025 g.

Test Example 29

A sample of instant fried noodles (buckwheat noodles) was prepared in the same manner as in Test Example 24 except that the amount of citric acid added was 0.5 g.

Test Example 30

A sample of instant fried noodles (buckwheat noodles) was prepared in the same manner as in Test Example 24 except that the amount of granulated sugar added was 0.2 g.

Test Example 31

A sample of instant fried noodles (buckwheat noodles) was prepared in the same manner as in Test Example 24 except that the amount of granulated sugar added was 1.0 g.

Test Example 32

A sample of instant fried noodles (buckwheat noodles) was prepared in the same manner as in Test Example 24 except that the amount of the dried bonito powder added was 0.5 g.

Test Example 33

A sample of instant fried noodles (buckwheat noodles) was prepared in the same manner as in Test Example 24 except that the amount of the dried bonito powder added was 2.0 g.

Test Example 34

A sample of instant fried noodles (buckwheat noodles) was prepared in the same manner as in Test Example 24 except that 2 g of a dried bonito extract powder (50% by mass of dried bonito in terms of dry matter) instead of the dried bonito powder was added to the kneading water.

Sensory evaluation about salty taste of noodles was performed by cooking and eating a sample of each Test Section. The evaluation was made by 5 experienced panelists. The result of Test Example 18 was defined as Score 5 and that of Test Example 19 was defined as Score 1. A case where salty taste was sensed at the same level as Test Example 18 and was very favorable was defined as Score 5; a case where salty taste was favorably sensed although not sensed at the same level as in Test Example 18 was defined as Score 4; a case where salty taste was generally acceptable although not sensed at the same level as in Test Example 18 was defined as Score 3; a case where salty taste was not enough although more sensed than in Test Example 19 was defined as Score 2; and a case where salty taste was sensed only at the same level as Test Example 19 was defined as Score 1. The cooking method here was as follows: a sample of noodles and a powdered soup for buckwheat noodles were placed in a bowl-type foamed polystyrene container; 490 ml of boiling water was poured thereinto, followed by closing with a lid; the resultant was left to still stand for 3 minutes, followed by removing the lid; and the content of the container was well mixed.

The noodle making properties and sensory evaluation results for each Test Section of Experiment 2 are shown in Table 2 below.

TABLE 2

| Test Section | Salt g/kg of main raw material powder | Potassium lactate g/g of reduced amount of salt | Granulated sugar g/g of reduced amount of salt | Citric acid g/g of reduced amount of salt | Dried bonito powder g of dry matter/g of reduced amount of salt | Kelp powder g of dry matter/g of reduced amount of salt | Dried bonito extract g of dry matter/g of reduced amount of salt | Score | Comment |
|---|---|---|---|---|---|---|---|---|---|
| 18 | 20 | | | | | | | 5 | Control (before salt reduction) |
| 19 | 12 | | | | | | | 1 | Reduced-salt product (by about 40%) |
| 20 | 12 | 0.20 | | | | | | 2 | Slightly, but insufficiently enhanced in salty taste |
| 21 | 12 | | 0.04 | | | | | 2 | Slightly, but insufficiently enhanced in salty taste |
| 22 | 12 | | | 0.013 | | | | 2 | Slightly, but insufficiently enhanced in salty taste |
| 23 | 12 | 0.20 | 0.04 | 0.013 | | | | 3.5 | Salty taste sensed at passing level, but not favorably |
| 24 | 12 | 0.20 | 0.04 | 0.013 | 0.13 | | | 5 | Very favorable at same level as in Test Section 18 |
| 25 | 12 | 0.20 | 0.04 | 0.013 | | 0.06 | | 4 | Salty taste favorable, but slightly weaker than in Test Section 24 |
| 26 | 12 | 0.10 | 0.04 | 0.013 | 0.13 | | | 4 | Salty taste weaker than in Test Section 24, but at favorable level |
| 27 | 12 | 0.39 | 0.04 | 0.013 | 0.13 | | | 4 | Harsh taste more sensed than in Test Section 24, but salty taste sensed at favorable level |
| 28 | 12 | 0.20 | 0.04 | 0.003 | 0.13 | | | 4 | Salty taste weaker than in Test Section 24, but at favorable level |
| 29 | 12 | 0.20 | 0.04 | 0.063 | 0.13 | | | 4 | Acid taste more sensed than in Test Section 24, but salty taste sensed at favorable level |
| 30 | 12 | 0.20 | 0.03 | 0.013 | 0.13 | | | 4 | Salty taste weaker than in Test Section 6, but at favorable level |
| 31 | 12 | 0.20 | 0.13 | 0.013 | 0.13 | | | 4 | Sweet taste more sensed than in Test Section 24, but salty taste sensed at favorable level |
| 32 | 12 | 0.20 | 0.13 | 0.013 | 0.06 | | | 4 | Very favorable at same level as in Test Sections 1 and 18 |
| 33 | 12 | 0.20 | 0.13 | 0.013 | 0.25 | | | 4 | Very favorable at same level as in Test Sections 1 and 18 |
| 34 | 12 | 0.20 | 0.13 | 0.013 | | | 0.13 | 4 | Very favorable at same level as in Test Sections 1 and 18 |

Since instant Japanese noodles (buckwheat noodles) are colored noodles, browning of the noodles by frying for drying is less easy to notice, and therefore an acid such as citric acid is not kneaded into the noodles in advance. As shown in Experiment 2, also salty taste of instant Japanese noodles (buckwheat noodles) was enhanced by adding potassium lactate, granulated sugar, citric acid, and a kelp processed product and/or a dried bonito processed product, instead of salt reduced in amount thereof, and thus instant Japanese noodles (buckwheat noodles) having favorable salty taste was obtained. A dried bonito processed product was more preferable than a kelp processed product in the instant Japanese noodles (buckwheat noodles), and a powder thereof was more preferable unlike the instant Japanese noodles (wheat noodles). Preferable amounts added, per a reduced amount of 1 g of salt added to the noodles, were as follows: potassium lactate: 0.10 to 0.39 g; granulated sugar: 0.03 to 0.13 g; citric acid: 0.003 to 0.063 g; and dried bonito processed product in terms of dry matter: 0.06 to 0.25 g.

The invention claimed is:

1. A method for producing instant Japanese noodles, comprising:
   adding a raw material to noodles by kneading the raw material into the noodles,
   wherein the raw material comprises: salt, and a supplement material, the supplement material comprising: potassium lactate, granulated sugar, citric acid, and a kelp processed product,
   wherein the supplement material replaces a portion of the salt such that the salt is added in a reduced amount,
   wherein the supplement material supplements a salty taste of the noodles comprising the salt in a reduced amount to a level comparable to instant Japanese noodles comprising salt in a non-reduced amount in which no salt has been replaced by the supplement material, and
   wherein the instant Japanese noodles are wheat noodles, and
   wherein the raw material comprises, for each 1 g reduction in salt relative to a control salt content that is the non-reduced amount of salt in instant Japanese noodles in which no salt has been replaced by the supplement material, an amount of the potassium lactate in a range from 0.03 to 0.08 g, an amount of the granulated sugar in a range from 0.05 to 0.20 g, an amount of the citric acid in a range from 0.04 to 0.17g, and an amount of the kelp processed product in terms of kelp dry matter in a range from 0.004 to 0.15 g.

2. A method for enhancing salty taste of instant Japanese noodles, comprising
   adding a raw material to noodles by kneading the raw material into the noodles,
   wherein the raw material comprises: salt, and a supplement material, the supplement material comprising: potassium lactate, granulated sugar, citric acid, and at least one material selected from the group consisting of a dried bonito processed product and a kelp processed product, and wherein the supplement material replaces a portion of the salt such that the salt is added in a reduced amount, wherein the supplement material synergistically enhances a salty taste of the noodles comprising the salt in a reduced amount to a level comparable to instant Japanese noodles comprising a control salt content that is a non-reduced amount in the instant Japanese noodles in which no salt has been replaced by the supplement material, as determined by a sensory evaluation, wherein the instant Japanese noodles are wheat noodles or buckwheat noodles, wherein, for wheat noodles, the control salt content is a first control salt content, and the raw material comprises, for each 1 g reduction in salt relative to the first control salt content of the noodles, an amount of the potassium lactate in a range from 0.03 to 0.08 g, an amount of the granulated sugar in a range from 0.05 to 0.20 g, an amount of the citric acid in a range from 0.04 to 0.17 g, and an amount of the kelp processed product in terms of kelp dry matter in a range from 0.004 to 0.15 g, and wherein, for buckwheat noodles, the control salt content is a second control salt content, and the raw material comprises, for each 1 g reduction in salt relative to the second control salt content of the noodles, an amount of the potassium lactate in a range from 0.10 to 0.39 g, an amount of the granulated sugar in a range from 0.03 to 0.13 g, an amount of the citric acid in a range of 0.003 to 0.063 g, and an amount of the dried bonito processed product in terms of dried bonito dry matter in a range of 0.06 to 0.25 g.

3. A method for producing instant Japanese noodles, comprising:

adding a raw material to noodles by kneading the raw material into the noodles, wherein the raw material comprises: salt, and a second supplement material, the second supplement material comprising: potassium lactate, granulated sugar, citric acid, and a dried bonito processed product, wherein the second supplement material supplements a salty taste of the noodles comprising the salt in a reduced amount to a level comparable to instant Japanese noodles comprising salt in a non-reduced amount in which no salt has been replaced by the supplement material, wherein the second supplement material replaces a portion of the salt such that the salt is added in a reduced amount, wherein the instant Japanese noodles are buckwheat noodles, and wherein the raw material comprises, for each 1 g reduction in salt relative to a control salt content that is the non-reduced amount in instant Japanese noodles in which no salt has been replaced by the supplement material, an amount of the potassium lactate in a range of 0.10 to 0.39 g, an amount of the granulated sugar in a range of 0.03 to 0.13 g, an amount of the citric acid in a range of 0.003 to 0.063 g, and an amount of the dried bonito processed product in terms of dried bonito dry matter in a range of 0.06 to 0.25 g.

* * * * *